Oct. 5, 1943.　　　　　D. SAMIRAN　　　　　2,330,845
MULTIPLE TANK FUEL SYSTEM INDICATOR ASSEMBLY
Filed Oct. 25, 1941　　　2 Sheets-Sheet 1

INVENTOR
DAVID SAMIRAN
BY
ATTORNEYS

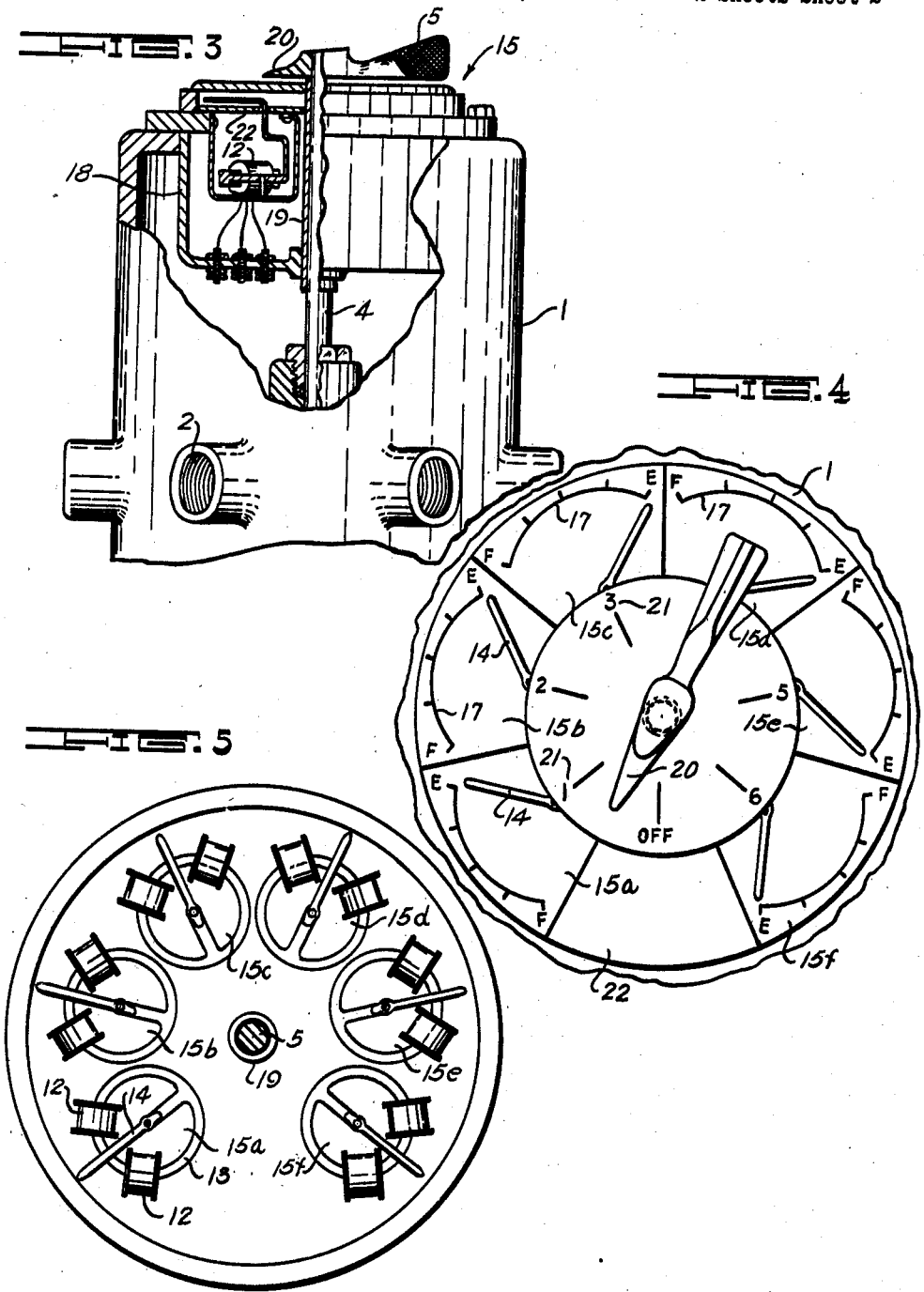

Patented Oct. 5, 1943

2,330,845

UNITED STATES PATENT OFFICE 2,330,845

MULTIPLE TANK FUEL SYSTEM INDICATOR ASSEMBLY

David Samiran, Fairfield, Ohio

Application October 25, 1941, Serial No. 416,595

3 Claims. (Cl. 73—290)

(Granted under the act of March 3, 1883, as amended April 30, 1928; 370 O. G. 757)

The invention described herein may be manufactured and used by or for Government for governmental purposes, without the payment to me of any royalty thereon.

This invention relates to an assembly of indicating apparatus forming part of a multiple tank fuel supply system particularly for aircraft, whereby a simultaneous indication is given of which one of the plurality of fuel tanks is connected for delivery of fuel to the power plant and further directing attention to the particular fuel contents gauge indicator to read to determine the instant quantity of fuel in the connected tank.

Present day aircraft generally employ a plurality of fuel supply tanks which may be selectively connected through a multi-way selector valve with a delivery conduit which conducts the fuel to a fuel pump which in turn delivers the fuel to the engine or engines of the aircraft for consumption thereby. The fuel tank selector valve is generally located within easy reach of the pilot so that the valve may be manually actuated from one selecting position to another and in addition to manual actuation, the valve may be provided with automatic power actuating means responsive to float control means to move the selector valve to different positions as the tanks are respectively emptied, such a power actuating means being disclosed and claimed in my copending application Serial Number 261,542, filed March 13, 1939, for "Improvements in Fuel Systems."

In conjunction with the operating member of the selector valve there is generally provided an indicator including a dial and pointer for indicating the particular tank connected through the valve to the delivery conduit. In addition each tank is provided with a fuel gauge generally of the electric remote indicating type for indicating the quantity of fuel in each respective tank the indicator units being usually mounted on the aircraft instrument board.

In the known prior art constructions no attempt has been made to correlate the selector valve indicating means with the fuel quantity gauges, so that the pilot in order to determine the proper gauge to note the quantity of fuel remaining in the selected fuel tank had to first refer to the valve position indicator to determine the connected tank and then refer to the corresponding gauge to determine the fuel contents of the connected tank, and since the fuel reserve is of such great importance, the pilot would have to remember the connected tank in noting new readings, or repeat the above process. Confusion in interpreting the fuel reserve in a connected tank of a multiple fuel tank system is dangerous and a number of aircraft crashes are directly traceable to this cause.

In accordance with the present invention the pointer and dial for indicating the fuel tank selector valve position and thus the fuel tank connected for fuel delivery is preferably mounted directly on the valve casing where such mounting is practical and the fuel contents gauge indicator units are also mounted on the valve casing so that each indicator is opposite and symmetrically disposed with respect to the associated tank indicium on the dial, the fuel contents indicator pointers and scales being visible from the upper side of the dial. Thus the pilot in order to determine the reserve of fuel in the particular connected tank in a single observation has his attention directed simultaneously to the indicium indicating the particular tank which is connected for fuel delivery and also to the correct fuel contents indicator to read to determine the instant quantity of fuel in the connected tank. This arrangement positively avoids confusion since the pilot is not required to integrate the particular selector valve position with the particular contents indicator to be read and the assembly still permits all of the gauge indicators to individually be read to determine the total contents of all of the tanks.

It is therefore the principal object of the invention to provide in a multiple tank fuel supply system having a selector valve, indicating means including a dial having tank identifying indicia thereon and a pointer cooperating with the dial indicia to indicate the particular connected fuel tank, the pointer being operatively positioned by movement of the operating means for the valve and a plurality of fuel quantity gauges each including an indicator operative to indicate the instant quantity of fuel in a respective tank and each gauge indicator being mounted relative to the dial indicia and pointer such that the pointer when indicating the connected fuel tank also indicates the proper fuel quantity indicator to read to determine the instant quantity of fuel in the connected tank.

A further object of the invention is the provision in combination with the operating member of a multiple fuel tank selector valve of indicating means responsive to movement of the operating member to indicate the connected tank and a plurality of fuel quantity gauge indicators arranged in relation to the indicating means so that the latter also indicates the respective gauge indicator to read to determine the instant fuel quantity in the connected tank.

Other objects of the invention will appear by reference to the following detailed description and to the appended drawings in which:

Figure 3 is a view partly in section illustrating details of the indicator assembly such as shown in Figure 1;

Figure 4 is a top plan view of the indicator dial of the device illustrated in Figure 3, and Figure 5 is a view similar to Figure 4 with the dial removed.

Figure 1:
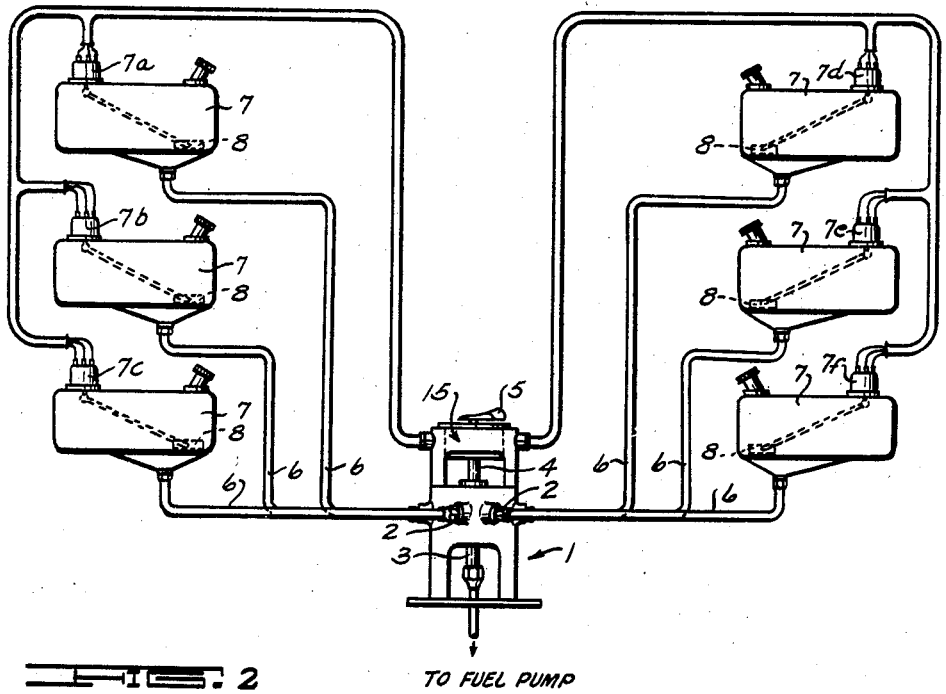
Figure 1 is a schematic view illustrating a multiple tank fuel system incorporating an indicator assembly in accordance with the invention.

Referring to Figure 1 the reference numeral 1 generally indicates a multi-way selector valve of a well-known type having a plurality of fuel inlets 2, any one of which may be selectively placed in communication with an outlet 3, which is adapted to be connected to the fuel pump (not shown) which delivers fuel to the engine carburetor or carburetors in a well-known manner. The selector valve 1 is provided with a valve operating shaft 4, which is illustrated in the figure as being operable by a manually controllable handle 5, but it is to be understood that the valve operator 4 may be automatically controlled in the manner disclosed in my aforementioned copending application, S. N. 261,542. Each of the fuel inlet bosses 2 of the selector valve is adapted to be connected by means of a conduit 6 to a fuel tank 7 in the fuel system of Figure 1, six tanks being shown, and thus by indexing the valve operating shaft 4 in any one of six predetermined positions, any one of the fuel tanks 7 may be connected through the valve to supply fuel to the outlet conduit 3. Each of the fuel tanks 7 has associated therewith a respective fuel quantity gauge transmitter unit such as indicated by reference numerals 7a to 7f, inclusive, the transmitter units generally being made in the form of a potentiometer which is actuated by means of a float mechanism 8 so that the transmitter causes a current change in a related circuit in accordance with the position of the float 8 and these currents are interpreted in terms of fuel quantity in the respective tanks by means of receivers or gauge indicators forming a part of the gauge assembly unit generally indicated by the reference numeral 15 in Figure 1.

Figure 2:
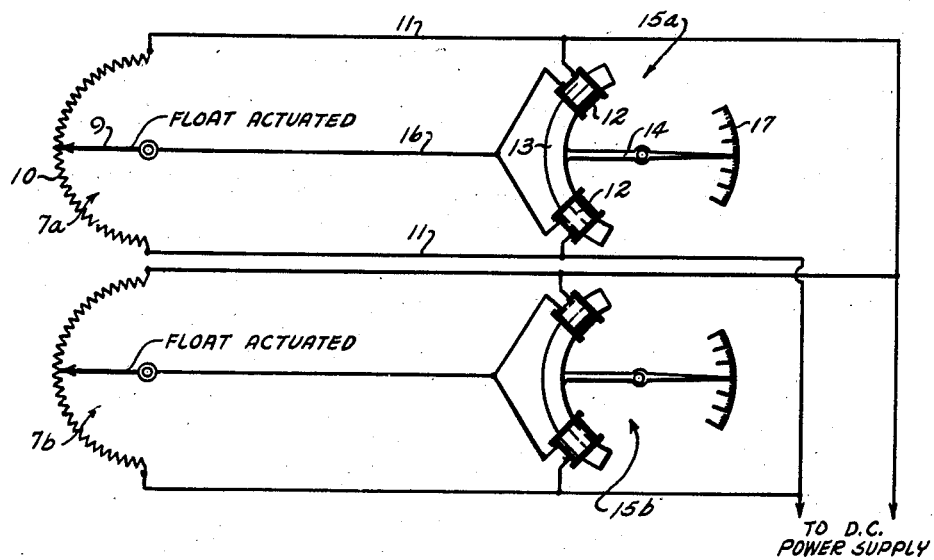
Figure 2 is a schematic view illustrating one type of electrical fuel quantity gauge suitable for use in the invention.

While the present invention is not primarily concerned with the specific form of fuel quantity gauges employed, one suitable type of known gauge unit is illustrated in Figure 2 and known as the "Nagel" fuel quantity gauge, which comprises a transmitter unit as indicated at 7a, formed of a rotatable potentiometer contact element 9 which is adapted to be positioned by means of a float mechanism such as illustrated at 8 in Figure 1, and contacting a potentiometer resistance winding 10 which is connected by means of conductors 11 to the coils 12 of a distant receiver unit or indicator gauge, such as indicated by the reference numeral 15a. The coils 12 of the receiver are in the form of solenoids which encompass an arcuate soft iron core member 13 which is rotatably mounted so as to actuate a pointer 14. The other terminals of the coils 12 are joined together and connected by a conductor 16 to the potentiometer contact arm 9. The conductors 11 are also each respectively connected to the positive and negative terminals of a suitable source of direct current such as a twelve volt battery (not shown), each of the gauge units employed such as 15a, 15b, etc., being connected in parallel to the power supply as indicated in Figure 2. As the potentiometer contact arm 9 is rotated by a float mechanism 8, the currents flowing through the respective coils 12 will be varied, causing the solenoid core 13 to be angularly rotated, and causing the pointer 14 to indicate the reserve of fuel in the respective tank by moving relative to a calibrated scale 17. It is thus seen that the contents of fuel in the respective tanks may be transmitted to a distant indicator by means of the above described system. Though only one type of remote indicating fuel gauge is illustrated and described, other types of electrical fuel quantity gauge systems are equally applicable to the invention and pneumatic and hydraulic types of gauges may also be employed.

Referring now to Figure 3 the indicator assembly, generally indicated by the reference numeral 15, is seen to comprise a casing 18 made of insulating material or the like which is mounted on a suitable extension of the casing of the selector valve 1. The casing 18 is provided with a central guide bushing 19 through which the valve operator shaft 4 passes, the outer end of the shaft having secured thereto the valve actuating handle 5, previously noted with respect to Figure 1. The valve actuating handle 5 is preferably made of a transparent plastic material and provided with a pointer projection 20 which is adapted to cooperate with tank identifying indicia 21 (see Figure 4) placed on a dial 22 which is concentrically mounted with respect to the bushing 19 and valve operating shaft 4. The casing 18 is adapted to serve as a housing for a number of fuel quantity gauge indicators such as 15a to 15f, inclusive (see also Figures 4 and 5) which gauge units are of the type as above described with reference to Figure 2, and each having a pointer 14 adapted to cooperate with a scale 17 marked on the dial 22, each of the gauges being electrically connected to the respective transmitter units 7a, 7b . . . 7f, respectively in the manner as described with reference to Figure 2.

As seen in Figure 4 the various gauge indicator units 15a, 15b . . . 15f, as illustrated six in number, are disposed concentrically around the axis of the bushing 19 (see also Figure 5) and are so located as to be substantially symmetrical with respect to a line drawn from the axis of bushing 19 through the respective tank indicium 17 which are labelled 1 to 6 inclusive in Figure 4, a seventh position of the valve being indicated as the "off" position of the valve on the dial 22.

Operation

Before starting the aircraft engines the pilot actuates the valve-setting handle 5 to connect a desired tank to the fuel outlet 3 (Figure 1) and at any time thereafter the quantity of fuel in the respective tank, for example, tank 1, is determined by reading the fuel quantity gauge indicator located opposite the tank indicium 1 such as gauge unit 15a, Figure 4, and the pilot's attention is directed to this gauge by the pointer projection 20 on the handle 5 without any mental calculations being necessary. Where an automatic valve actuating mechanism is employed, as disclosed and claimed in my previously identified application, S. N. 261,542, upon a respective tank becoming empty, a float actuated mechanism (not shown) causes a solenoid to move the valve actuating shaft 4 to position the valve in a new tank selecting position and in such a case the pointer 20 again indicates both the connected tank and the proper fuel gauge indicator to be read. The arrangement of indicators in accordance with the invention positively prevents the pilot from making an error as to the fuel quantity present in the connected tank because no confusion can arise as to which of the tanks is connected and which indicator should be read, which confusion is liable to arise if the pilot has not checked the fuel contents of the connected tank for some time and should forget the identity of the particular tank which is connected, a mistake which has happened all too frequently in the prior art indicator arrangements.

While the invention has been illustrated and described as being mounted directly on the fuel selector valve, it is obvious that some installations will prevent the valve from being located so that the indicators would be visible to the pilot, and in such a case the valve actuating shaft 4 may be operatively connected to the indicator assembly 15 through any suitable connection and the indicator assembly may then be placed on the instrument panel, the utility of the indicator assembly being in no way affected by such a remote connection.

It is also to be understood that any suitable type of remote fuel quantity gauge units may be employed with the invention since it is immaterial what means is employed to actuate the respective indicator pointers 14, so long as the positioning thereof is an accurate measure of the fuel contents thereof of the associated fuel tank.

While a preferred embodiment of the invention has been illustrated and described, many modifications and changes therein will become apparent to those skilled in the art as falling within the scope of the invention as defined by the appended claims.

I claim:

1. In a multiple tank fuel supply system having a selector valve and a settable valve control means including an operating shaft for connecting any selected tank, in combination with said valve and control means, a dial concentrically mounted with respect to said shaft, indicia on said dial identifying the respective fuel tank selecting positions of said operating shaft, a pointer actuated by said shaft and rotatable therewith to cooperate with the said indicia, and a plurality of fuel quantity indicating gauges arcuately disposed concentric with said shaft and each located radially opposite the corresponding tank indicium, whereby when said pointer indicates the connected fuel supply tank it simultaneously indicates the fuel quantity indicating gauge to be read to determine the contents of the associated fuel tank.

2. The structure as claimed in claim 1 in which the said pointer includes a means for manually actuating said valve operating shaft.

3. In a multiple tank fuel supply system having a selector valve and a settable valve control means including an operating shaft for connecting any selected tank, in combination with said valve and control means, an annular dial structure concentrically mounted with respect to said shaft, a pointer mounted on said shaft, indicia on said dial cooperating with said pointer to indicate the respective tank connected for delivery through the selector valve in each operative setting position of the valve operating shaft and a plurality of fuel quantity indicating gauges associated with said dial and each having a pointer and a scale for indicating the instant quantity of fuel in a particular fuel tank, each of said indicating gauges being symmetrically disposed with respect to a radial line from the axis of the valve operating shaft and passing through the corresponding tank identifying indicium on said dial.

DAVID SAMIRAN.